US011675975B2

(12) United States Patent
Mote et al.

(10) Patent No.: US 11,675,975 B2
(45) Date of Patent: Jun. 13, 2023

(54) WORD CLASSIFICATION BASED ON PHONETIC FEATURES

(71) Applicant: Google LLC, Mountain View, CA (US)

(72) Inventors: Nicolaus T. Mote, Palo Alto, CA (US); Ryan P. Doherty, San Jose, CA (US)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 16/915,298

(22) Filed: Jun. 29, 2020

(65) Prior Publication Data

US 2020/0327281 A1 Oct. 15, 2020

Related U.S. Application Data

(63) Continuation of application No. 14/478,033, filed on Sep. 5, 2014, now abandoned.

(60) Provisional application No. 62/042,671, filed on Aug. 27, 2014.

(51) Int. Cl.

| | |
|---|---|
| ***G06F 40/237*** | (2020.01) |
| ***G06F 16/903*** | (2019.01) |
| ***G06F 40/30*** | (2020.01) |
| ***G06F 40/242*** | (2020.01) |
| ***G06F 40/279*** | (2020.01) |

(52) U.S. Cl.

CPC ...... *G06F 40/237* (2020.01); *G06F 16/90344* (2019.01); *G06F 40/242* (2020.01); *G06F 40/279* (2020.01); *G06F 40/30* (2020.01)

(58) Field of Classification Search

None

See application file for complete search history.

(56) References Cited

U.S. PATENT DOCUMENTS 5,812,863 A * 9/1998 Ishikawa ............... G06F 40/253 715/257
6,018,736 A * 1/2000 Gilai ................... G06F 16/3329 707/999.005
6,108,627 A * 8/2000 Sabourin ............... G10L 15/187 704/E15.02
6,134,528 A * 10/2000 Miller ................... G06F 40/284 704/E13.011
6,236,965 B1 * 5/2001 Kim ...................... G10L 15/187 704/E15.02
6,385,579 B1 * 5/2002 Padmanabhan ....... G10L 15/063 704/243
6,393,399 B1 * 5/2002 Even ..................... G10L 15/193 704/235

(Continued)

OTHER PUBLICATIONS

Cook, Paul, and Suzanne Stevenson. "Automatically identifying the source words of lexical blends in English," Computational Linguistics 36.1 (2010): 129-149.

(Continued)

*Primary Examiner* — Jonathan C Kim

(74) *Attorney, Agent, or Firm* — Fish & Richardson P.C.

(57) ABSTRACT

Methods, systems, and apparatus, including computer programs encoded on a computer storage medium, for obtaining a textual term; determining, by one or more computers, a vector representing a phonetic feature of the textual term; comparing the vector representing the phonetic feature of the textual term with a reference vector representing a phonetic feature of a reference textual term; and classifying the textual term based on the comparing the vector with the reference vector.

13 Claims, 4 Drawing Sheets

(56) References Cited

U.S. PATENT DOCUMENTS 6,411,932 B1 * 6/2002 Molnar .................. G10L 13/00 704/254
6,976,019 B2 * 12/2005 Davallou ................ G06F 16/30 704/238
7,165,032 B2 1/2007 Bellegarda
7,283,964 B1 10/2007 Geilhufe
7,353,164 B1 * 4/2008 Bellegarda ............ G06F 40/232 704/10
9,164,983 B2 * 10/2015 Liu ....................... G06F 40/126
2002/0052740 A1 * 5/2002 Charlesworth ....... G06F 16/685 704/E15.02
2002/0065794 A1 * 5/2002 Fruensgaard ....... G06F 16/3338
2002/0087313 A1 * 7/2002 Lee ....................... G06Q 30/06 704/E15.044
2002/0152246 A1 * 10/2002 Critchlow ............... G06F 40/53 715/265
2003/0187649 A1 * 10/2003 Logan ..................... G10L 15/26 704/E15.045
2004/0054533 A1 * 3/2004 Bellegarda ............ G10L 15/187 704/254
2005/0060156 A1 * 3/2005 Corrigan ................. G10L 13/04 704/270.1
2006/0241944 A1 * 10/2006 Potter ................... G06F 40/247 704/254
2006/0282266 A1 * 12/2006 Lopez-Barquilla ..... G10L 15/18 704/E15.018
2008/0046405 A1 * 2/2008 Olds ................... G06F 16/3322
2008/0077396 A1 * 3/2008 Hsu ....................... G06F 40/274 704/10
2008/0091413 A1 * 4/2008 El-Shishiny .......... G06F 16/322 704/10
2008/0104056 A1 5/2008 Li et al.
2008/0147381 A1 * 6/2008 Yu ......................... G06F 40/268 704/255
2008/0183696 A1 * 7/2008 Lagunas ............... G06F 40/232 707/999.005
2008/0189605 A1 * 8/2008 Kay ...................... G06F 40/274 715/257
2009/0240488 A1 * 9/2009 White ..................... G10L 15/30 345/173
2009/0254819 A1 * 10/2009 Song ..................... G06F 40/242 715/257
2010/0179801 A1 * 7/2010 Huynh .................... G06F 40/56 704/1
2010/0180198 A1 * 7/2010 Iakobashvili ......... G06F 40/232 715/257
2011/0010178 A1 * 1/2011 Lee ....................... G06F 40/129 704/E13.011
2011/0093259 A1 * 4/2011 Saffer ..................... G10L 15/06 704/E11.001
2011/0184723 A1 * 7/2011 Huang .................. G06F 40/205 704/8
2011/0295897 A1 * 12/2011 Gao .................... G06F 16/3322 707/780
2012/0173574 A1 * 7/2012 Homma .................. G10L 15/19 707/E17.101
2013/0080174 A1 * 3/2013 Nishiyama ............. G10L 15/22 704/260
2013/0124474 A1 * 5/2013 Anderson ........... G06F 16/3338 707/634
2013/0173258 A1 * 7/2013 Liu ......................... G06F 40/40 704/9
2013/0282645 A1 * 10/2013 Culbertson ............. G10L 15/18 706/52
2013/0283156 A1 * 10/2013 Al Badrashiny ..... G06F 40/232 715/257
2014/0372119 A1 * 12/2014 Parada .................. G06F 16/957 707/706
2015/0006441 A1 * 1/2015 Suzuki ................ G06F 16/9535 706/11
2016/0062979 A1 * 3/2016 Mote ................. G06F 16/90344 704/9

OTHER PUBLICATIONS

International Search Report and Written Opinion in International Application No. PCT/US2015/045352, dated Dec. 3, 2015, 15 pages.
Mikolov, Tomas et al., “Distributed Representations of Words and Phrases and their Compositionality”, Proceedings of NIPS, 2013, 9 pages.
Mikolov, Tomas et al., “Efficient Estimation of Word Representations in Vector Space”, Proceedings of Workshop at ICLR, 2013, 12 pages.
Mikolov, Tomas et al., “Linguistic Regularities in Continuous Space Word Representations”, Proceedings of NAACL HLT, 2013, 6 pages.
Paaß et al., “SVM Classification Using Sequences of Phonemes and Syllables,” Aug. 23, 2002, pp. 373-384.
Sriram et al., “Phonetic Distance Based Cross-lingual Search,” International Conference on Natural Language Processing, Dec. 22, 2004, pp. 1-5.

* cited by examiner

WORD CLASSIFICATION BASED ON PHONETIC FEATURES

CROSS-REFERENCE TO RELATED APPLICATION

This application is a continuation application of, and claims priority to, U.S. patent application Ser. No. 14/478,033, titled "WORD CLASSIFICATION BASED ON PHONETIC FEATURES," filed on Sep. 5, 2014, which application claims the benefit under 35 U.S.C. § 119(e) of U.S. Provisional Application Ser. No. 62/042,671, filed on Aug. 27, 2014. The disclosure of each of the foregoing applications is incorporated herein by reference.

BACKGROUND

This specification relates to using features of a textual term to classify the textual term.

SUMMARY

According to one innovative aspect of the subject matter described in this specification, phonetic features of textual terms such as pronunciation of the textual terms may be generated. A model for processing textual terms may be trained using the phonetic features. The model may be used to generate a representation of the phonetic features. The representation of the phonetic features of a textual term may be used to classify the textual term. The representation of the phonetic features of a textual term may be compared with a representation of phonetic features of another textual term to determine a relationship between the two textual terms. The phonetic features may be used augment a word-based model to provide a more comprehensive representation for textual terms.

In general, one innovative aspect of the subject matter described in this specification can be embodied in methods that include the actions of obtaining a textual term; determining, by one or more computers, a vector representing a phonetic feature of the textual term; comparing the vector representing the phonetic feature of the textual term with a reference vector representing a phonetic feature of a reference textual term; and classifying the textual term based on the comparing the vector with the reference vector.

These and other implementations can each optionally include one or more of the following features. Obtaining the textual term may include obtaining the textual term from a resource stored at a remote computer. Obtaining the textual term may include obtaining the textual term from a search query. Determining the vector representing the phonetic feature of the textual term may include determining a pronunciation of the textual term.

The textual term may include a plurality of characters. Determining the vector representing the phonetic feature of the textual term may include determining a first vector representing a phonetic feature of a subset of the plurality of characters of the textual term. Classifying the textual term may include determining that the subset of the plurality of characters of the textual term is similar to the reference textual term based on the comparing the vector with the reference vector; and in response to determining that the subset of the plurality of characters of the textual term is similar to the reference textual term, associating a definition of the reference textual term to the subset of the plurality of characters of the textual term.

The actions may include determining a second vector representing a phonetic feature of a second subset of the plurality of characters of the textual term; comparing the second vector with a second reference vector representing a phonetic feature of a second reference textual term; determining that the second subset of the plurality of characters is similar to the second reference textual term based on comparing the second vector with the second reference vector; and in response to determining that the second subset of the plurality of characters is similar to the second reference textual term, associating a definition of the second reference textual term to the second subset of the plurality of characters of the textual term.

Comparing the vector with the reference vector may include determining a cosine distance between the vector and the reference vector.

Classifying the textual term may include determining that the cosine distance is within a specific distance; and in response to determining that the cosine distance is within the specific distance, classifying the textual term as being similar to the reference textual term.

Classifying the textual term may include determining a likelihood that the textual term is similar to the reference textual term; and classifying the textual term based on the likelihood at the textual term is similar to the reference textual term.

Classifying the textual term may include determining that the textual term is similar to the reference textual term; and in response to determining that the textual term is similar to the reference textual term, associating a definition of the reference textual term to the textual term.

Obtaining the textual term may include obtaining one or more textual terms that are surrounding the textual term. Determining the vector representing the phonetic feature of the textual term may include determining the vector using (i) the phonetic feature of the textual term and (ii) the one or more textual terms that are surrounding the textual term.

Advantageous implementations may include one or more of the following features. A system can use phonetic features to classify certain types of textual terms that may not be classified using textual features, such as cognate words, invented words, lemmatization of words, word misspelling, hashtags, or alternative spelling of words. A system can use phonetic features to derive semantic relationships between words that are similar in sounds and concept but not in usage. A system can use phonetic features to augment a word-based model to provide a more comprehensive representation for any objects of interests including textual terms.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
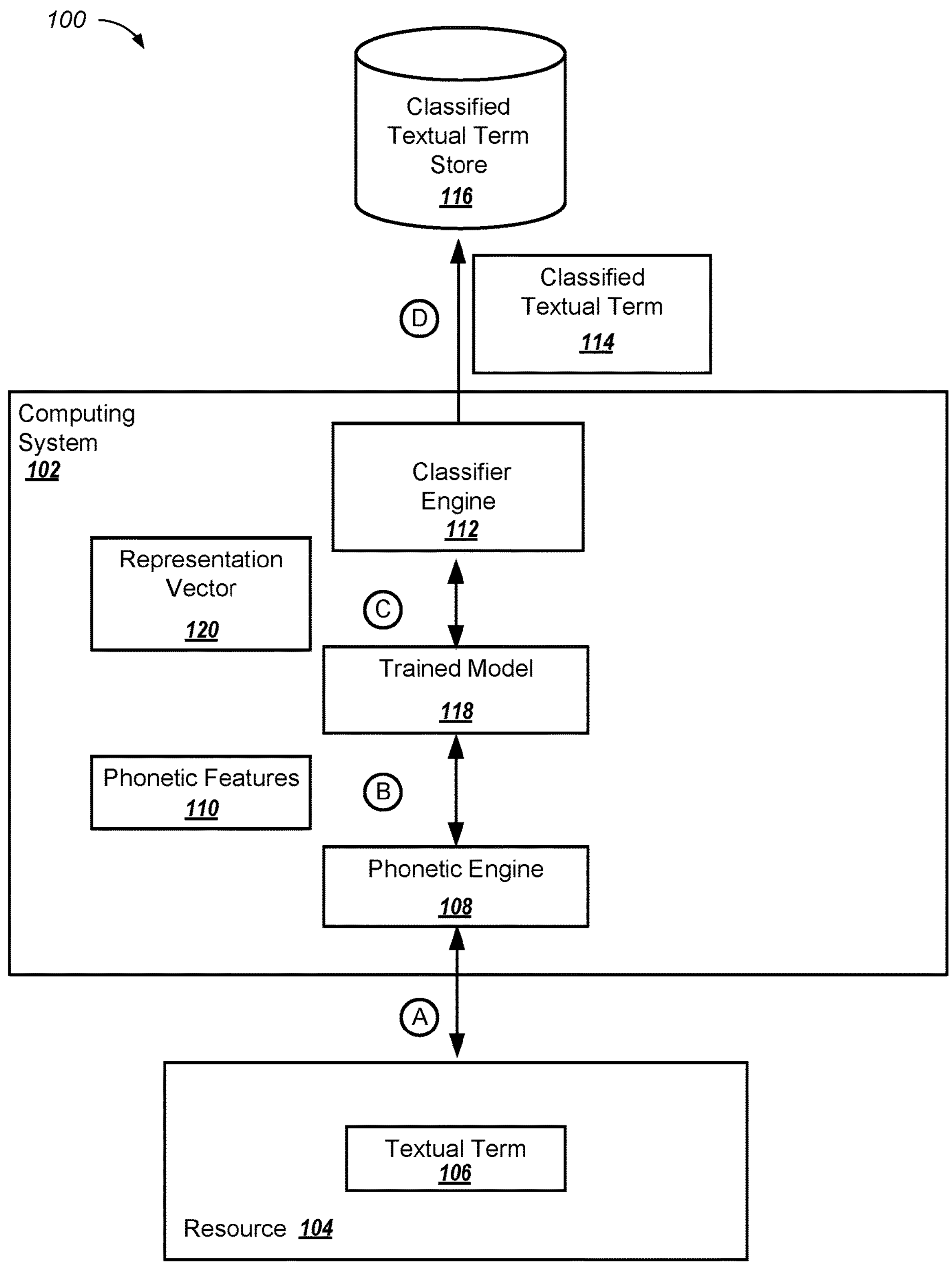
FIG. 1 is a block diagram of an example system.

FIG. 1 is a block diagram of an example system 100. The system 100 can be used to classify a textual term using the phonetic features of the textual term. A textual term is a sequence of one or more letters. For example, a textual term may include a word having a dictionary definition, a word without a dictionary definition, a compounded word, a concatenation of textual characters, textual metadata embedded in a resource, or any textual representation of a textual or non-textual resource. The system 100 compares a vector representing the phonetic features (e.g., the pronunciation of the textual term) of the textual term with one or more vectors representing phonetic features of one or more other textual terms to classify the textual term. Examples of classifying a textual term include determining a definition of the textual term, determining other textual terms that are related to the textual term, determining a relationship between the textual term and another textual term, or determining a relationship between the textual term and a non-textual object, The system 100 includes a resource 104, a computing system 102, and a classified textual term store 116. In general, the resource 104 may be any resource that is associated with a textual term 106. The computing system 120 may be a remote server system that receives the textual term 106 as input, and based on phonetic features of the textual term 106, provides a classification of the textual term 106 as output. The functions performed by the computing system 120 can be performed by individual computer systems or can be distributed across multiple computer systems.

The computing system 120 includes a phonetic engine 108, a trained model 118, and a classifier engine 112. The phonetic engine 108 derives one or more phonetic features 110 of the textual term 106. The trained model 118 generates a representation vector 120 that represents the phonetic features of the textual term 106 in a vector space. The classifier engine 112 classifies the textual term 106 based on the representation vector 120. For example, the classifier engine 112 may compare the representation vector 120 with other representation vectors generated by the trained model 118 in the vector space, and the classifier engine 112 may classify the textual term 106 based on the comparison. The classifier engine 112 outputs a classified textual term 114 that represents a classification of the textual term 106. The classified textual term 114 is stored in the classified textual term store 116.

The resource 104, the computing system 102, and the classified textual term store 116 may be communicatively coupled using a wired network or wireless network or a combination of both. The network can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of networks.

FIG. 1 also illustrates an example flow of data, shown in stages (A) to (C). Stages (A) to (D) may occur in the illustrated sequence, or they may occur in a suitable sequence that is different than in the illustrated sequence.

During stage (A), the computing system 120 obtains the textual term 106 in the resource 104. In some implementations, the resource 104 may be a textual resource that includes the textual term 106. For example, the resource 104 may be a document in a corpus of documents, where the textual term 106 is included as a word in the document. As another example, the resource 104 may be the source code for a webpage, where the textual term 106 is included in the source code. In some implementations, the resource 104 may be a non-textual resource that is represented by the textual term 106. For example, the resource 104 may be an image, and the textual term 106 may be a caption of the image. As another example, the resource 104 may be a data object, where the textual term 106 is metadata associated with the data object. In some implementations, the resource 104 may be dynamically generated. For example, the resource 104 may be a search query, where the textual term 106 is a search term in the search query. As another example, the resource 104 may be a trending search term, as determined by another computing system.

During stage (B), the phonetic engine 108 determines the phonetic features of the textual term 106, and generates phonetic features 110. In some implementations, the phonetic features 110 include a predicted pronunciation of the textual term. The pronunciation of the textual term can be predicted using a number of suitable techniques. For example, the phonetic engine 108 may use a pronunciation dictionary to predict the pronunciation of the textual term 106. As another example, the phonetic engine 108 may use a set of acoustic rules to predict the pronunciation of the textual term 106. As another example, the phonetic engine 108 may input the textual term 106 to a trained acoustic model to generate a predicted pronunciation of the textual term 106. In some implementations, the phonetic features 110 include an acoustic signal representing the predicted pronunciation of the textual term. For example, the phonetic engine 108 may input the textual term 106 to a trained text-to-speech model to generate the acoustic signal representing the predicted pronunciation of the textual term 106.

In some implementations, the phonetic engine 108 separates the textual term 106 into multiple textual terms, and determines the phonetic features of each respective textual term. For example, for an invented textual term "CompuVehicle," the phonetic engine 108 may separate the textual term into two textual terms "Compu" and "Vehicle," and determines the pronunciations of each of "Compu" and "Vehicle." In some implementations, the phonetic features 110 include the phonetic features of the textual term 106 and the phonetic features of the separated textual terms. For example, the phonetic features 110 of the textual term "CompuVehicle" may include the pronunciations of "CompuVehicle," "Compu," "Vehicle," "CompuVe," "hicle," and so on.

During stage (C), the trained model 118 determines a representation vector 120 based on the phonetic features 110. The representation vector 120 may be mapped to a vector space that includes reference vectors representing phonetic features of known textual terms. In some implementations, the trained model 118 is trained using these known textual terms, and the reference vectors are generated by the trained model 118.

In some implementations, the trained model 118 includes an embedding function that receives the phonetic features 110 and, in accordance with a set of embedding function parameters, applies a transformation to the phonetic features 110 that maps the phonetic features 110 into a continuous high-dimensional numeric representation. For example, the embedding function can apply a transformation to the phonetic features 110 to map the phonetic features 110 into a floating point representation vector 120. In some implementations, the trained model 118 includes a neural network model that receives the phonetic features 110 and processes the phonetic features 110 through multiple hidden layers to generate the representation vector 120.

In cases where the phonetic features 110 include the phonetic features of the textual term 106 and the phonetic features of the separated textual terms, the trained model 118 may determine a respective representation vector for each of the textual terms. For example, for the textual term "CompuVehicle" described above, the trained model 118 may determine a respective representation vector for each of the textual terms "CompuVehicle," "Compu," "Vehicle," "CompuVe," "hicle," and so on.

During stage (D), the classifier engine 112 classifies the textual term 106 using the representation vector 120, and stores the classified textual term 114 in the classified textual term store 116. The classifier 110 can be any multiclass or multilabel classifier, e.g., a multiclass logistic regression classifier, a multiclass support vector machine classifier, or a Bayesian classifier.

The classifier engine 112 may compare the representation vector 120 with one or more reference vectors in the vector space. In some implementations, the classifier engine 112 determines a distance, e.g., a cosine distance, between the representation vector 120 and one or more reference vectors in the vector space, and classifies the textual term 106 based on the cosine distance. If the cosine distance between the representation vector 120 and a particular reference vector is within a specific vector distance, the classifier engine 112 may classify that the textual term 106 is related to the textual term associated with the particular reference vector.

For example, the classifier engine 112 may determine that the cosine distance between the representation vector of "CompuVehicle" is not within the specific vector distance with any reference vectors in the vector space. However, the classifier engine 112 may determine that the cosine distance between the representation vector of the separated textual term "Compu" is within the specific vector distance with the reference vector of a known textual term "Computer," and the classifier engine 112 may classify that the separated textual term "Compu" is related to the known textual term "Computer." As another example, the classifier engine 112 may determine that the representation vector of the separated textual term "Vehicle" is numerically equal to the reference vector of a known textual term "Vehicle," and the classifier engine 112 may classify that the separated textual term "Vehicle" is equivalent of the known textual term "Vehicle."

As another example, a resource 104 may include a textual term 106 "Vehecle" that is an unintended spelling error of a known textual term "Vehicle." The classifier engine 112 may determine that the representation vector of the textual term 106 "Vehecle" is within the specific vector distance to the reference vector of the known textual term "Vehicle," and the classifier engine 112 may classify that the textual term 106 "Vehecle" is related to the known textual term "Vehicle" because their phonetic features (e.g., pronunciations) are similar. Consequently, even textual terms with spelling errors can still be useful for subsequent analysis.

In some implementations, the classified textual term 114 is a data structure indicating the classification of the textual term 106. For example, the classified textual term 114 for the textual term "CompuVehicle" may be an ordered list {"CompuVehicle", "Computer", "Vehicle"}, indicating that the classifier engine 112 has determined that the known textual terms "Computer" and "Vehicle" are related to the textual term "CompuVehicle."

In some implementations, the classified textual term 114 is represented by a word score vector, where each field of the word score vector corresponds to a respective known textual term in a set of known textual terms. For example, each field of the word score vector may include a score indicating a probability that the definition of the textual term 106 corresponds to the definition of the respective known textual term. The classifier engine 112 may determine that the textual term 106 is similar to a particular known textual term if the particular known textual term has the highest score in the word score vector.

The classified textual term 114 stored in the classified textual term store may be used to provide a definition for the textual term 106. The classified textual term 114 stored in the classified textual term store may be used to provide a relationship between the textual term 106 and other known textual terms. The classified textual term 114 stored in the classified textual term store may be used to provide a relationship between the textual term 106 and other known textual terms. The classified textual term 114 stored in the classified textual term store may be used to train an updated model for generating representation vectors. The classified textual term 114 stored in the classified textual term store may be used as input to another computing system.

Figure 2:
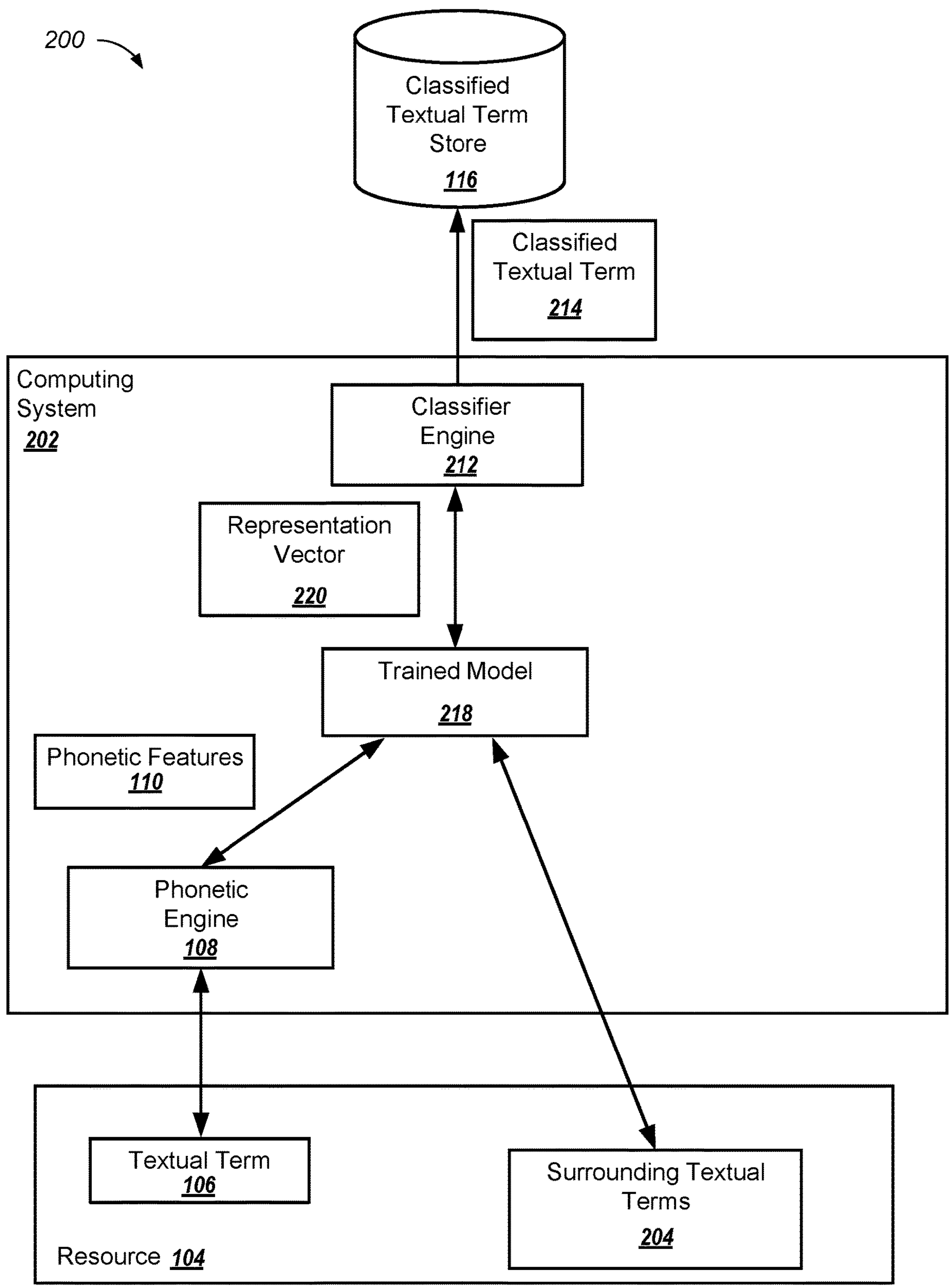
FIG. 2 is a block diagram of an example system that uses phonetic features of a textual term to augment a word-based model.

FIG. 2 is a block diagram of the example system 200 that can use phonetic features of a textual term to augment a word-based model. In general, a word-based model uses textual terms that surround a particular textual term to classify the particular textual term. In some implementations, a word-based model discards textual terms that the computing system cannot classify, and valuable information may be lost as the results. For example, a textual term that has been invented by an author may not be captured by a word-based model because the surrounding textual terms may not provide sufficient information for the classification of the invented textual term. Phonetic features may be used to provide a complementary signal to a word-based model, resulting in a more comprehensive vector space for classifying textual terms. The example system 200 includes a resource 104, a computing system 202, and a classified textual term store 116. The computing system 202 includes a phonetic engine 108, a trained model 218, and a classifier engine 212.

The resource 104 includes the textual term 106 and surrounding textual terms 204. For example, if the textual term 106 is at position t in a sequence of textual terms, the surrounding textual terms 204 are known words at position t−N, . . . , t−1, t+1, . . . , t+N, respectively, where N is a predetermined integer value.

The trained model 218 uses one or both of the phonetic features 110 or the surrounding textual terms 204 to determine a representation vector 220 of the textual term 106. In some implementations, the trained model 218 includes a word-based embedding function that receives a sequence of textual terms and, in accordance with a set of embedding function parameters, applies a transformation to the textual terms that maps the textual terms into a continuous high-dimensional word-based vector space. For example, the word-based embedding function may be a combining embedding function. A combining embedding function maps each textual term in the sequence of textual terms to a respective continuous high-dimensional word-based vector space, for example, to a respective high-dimensional vector of floating point numbers, based on current parameter values of the embedding function, e.g., as stored in a lookup table, and then merges the respective floating point vectors into a single merged vector. The merged floating point representation vector can be used by the classifier engine 212 to classify the textual term 106.

In some implementations, the trained model 218 uses the phonetic features 110 to modify the floating point representation vector to determine the representation vector 220. For example, the trained model 218 may add one or more dimensions in the word-based vector space to represent the phonetic features of textual terms. The trained model 218 may map the phonetic features 110 to the additional dimensions, and the values in the additional dimensions may be used by the classifier engine 212 to classify the textual term 106.

The classifier engine 212 uses the representation vector 220 to determine a classified textual term 214. The classifier 212 receives the representation vector 220 generated by the trained model 218 and classifies the textual term 106 similar to the classifier 112. In some implementations, if the classifier engine 212 determines that the values in the word-based vector space cannot be used to classify the textual term 106, the classifier engine 212 uses the values in the additional dimensions corresponding to the phonetic features 110 to classify the textual term 106. In some implementations, after the classifier engine 212 classifies the textual term 106 using values in the word-based vector space, the classifier engine 212 classifies the textual term 106 using values in the additional dimensions corresponding to the phonetic features 110, and compares the two classifications. The classifier engine 212 may select one or both classifications to be included in the classified textual term 214.

Figure 3:
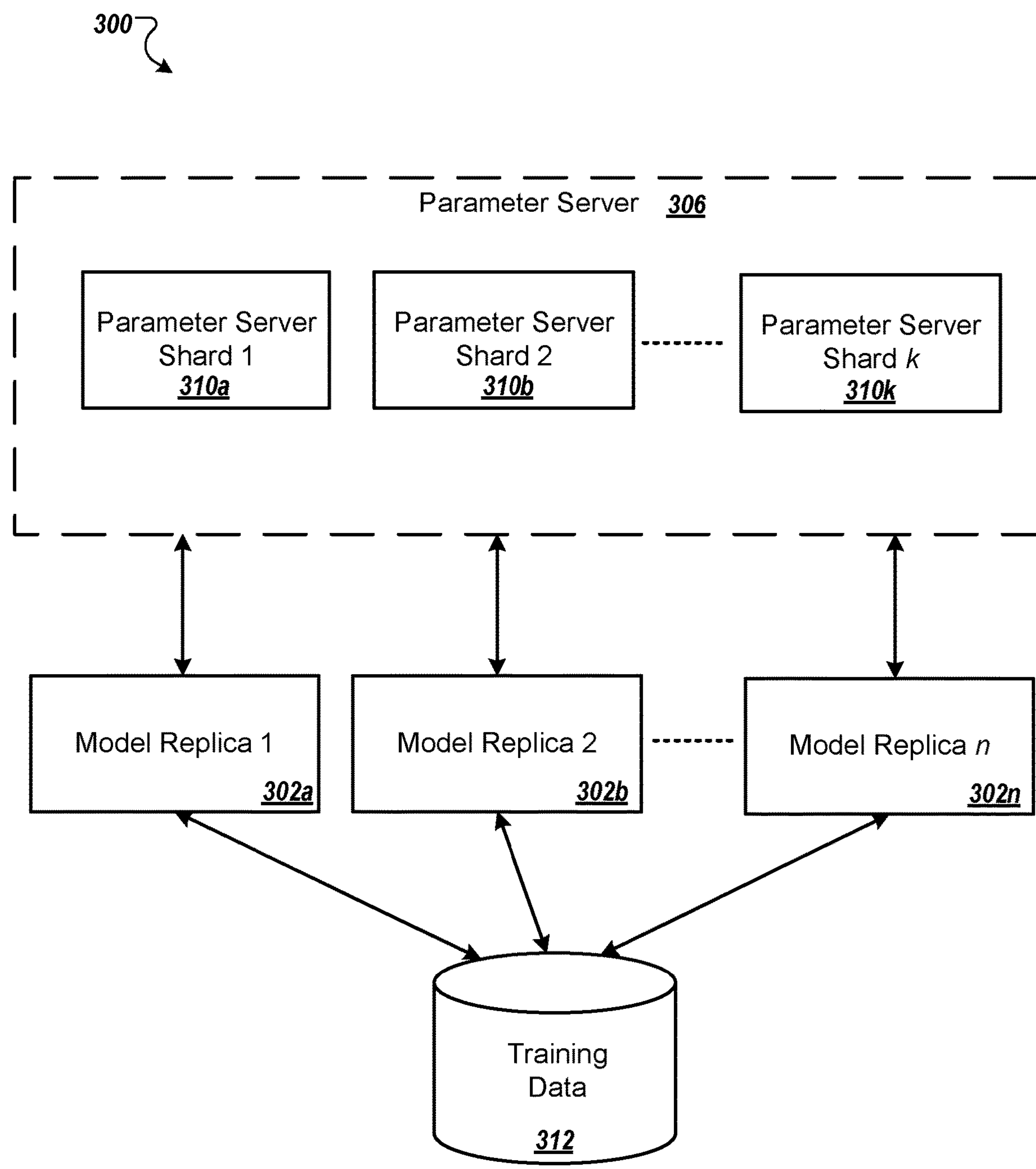
FIG. 3 is a block diagram of an example system for training a model.

FIG. 3 is a block diagram of an example system 300 that can train a model. In general, a model such as the trained model 118 or the trained model 218 may be trained in any number of ways. The example system 300 illustrates parallel training of a model, where the trained model can be used in systems such as the example systems 100 and 200.

The model receives input and generates an output based on the received input and on values of the parameters of the model. For example, a model may receive data identifying phonetic features of textual terms and, based on the phonetic features of the textual terms and on the parameters of the model, may generate a vector that represents a textual term. The model may be composed of a single level of linear or non-linear operations or may be composed of multiple levels of linear or non-linear operations. An example of a model is a neural network with one or more hidden layers.

The model can be trained using training data, i.e., the training data in training data database 312. The training data in the training data database 312 are inputs for which the desired output, i.e., the output that should be generated by the model, is known. In order to train the model, i.e., find optimal values of the model parameters, an objective function is developed that is a measure of the performance of the model on the set of training data as a function of the model parameters. The optimal values of the parameters of the model can then be found by finding a minimum of the objective function. In particular, multiple iterations of a stochastic gradient descent procedure can then be performed to find the optimal values of the parameters.

The example system 300 includes multiple model replicas 302*a-n*. Each of the model replicas 302*a-n* is an identical instance of a model and can be implemented as one or more computer programs and data deployed to be executed on a computing unit. Advantageously, the computing units are configured so that they can operate independently of each other. In some implementations, only partial independence of operation is achieved, for example, because replica instances share some resources.

A computing unit may be, e.g., a computer, a core within a computer having multiple cores, or other hardware or software within a computer capable of independently performing the computation for the model replica. Each model replica 302*a-n* operates independently from each of the other model replicas 302*a-n* and is configured to communicate with the training data database 312 and a parameter server 306 through a network, e.g., a local area network (LAN) or wide area network (WAN), e.g., the Internet, in order to compute delta values for the parameters of the model. A delta value for a parameter is a value that the replica has determined is to be applied to the current value of the parameter so that it approaches its optimal value.

The parameter server 306 maintains the current values of the parameters of the model and updates the values as the results of training are uploaded by the replicas. The functionality of the parameter server 306 may be partitioned among multiple parameter server shards 310*a-k*. That is, each of the parameter server shards 310*a-k* maintains values of a respective subset of the parameters of the model, such that the parameters of the model are partitioned among the parameter server shards 310*a-k*. Each parameter server shard 310*a-k* is implemented on a respective independent computing unit. Advantageously, the computing units are configured so that they can operate independently of each other. In some implementations, only partial independence of operation is achieved, for example, because replica instances share some resources.

Each of the parameter server shards 310*a-k* provides values of parameters to the model replicas 302*a-n*, receives delta values of the parameters from the model replicas 302*a-n*, and updates stored values of the parameters based on the received delta values independently from each other parameter server shard.

Figure 4:
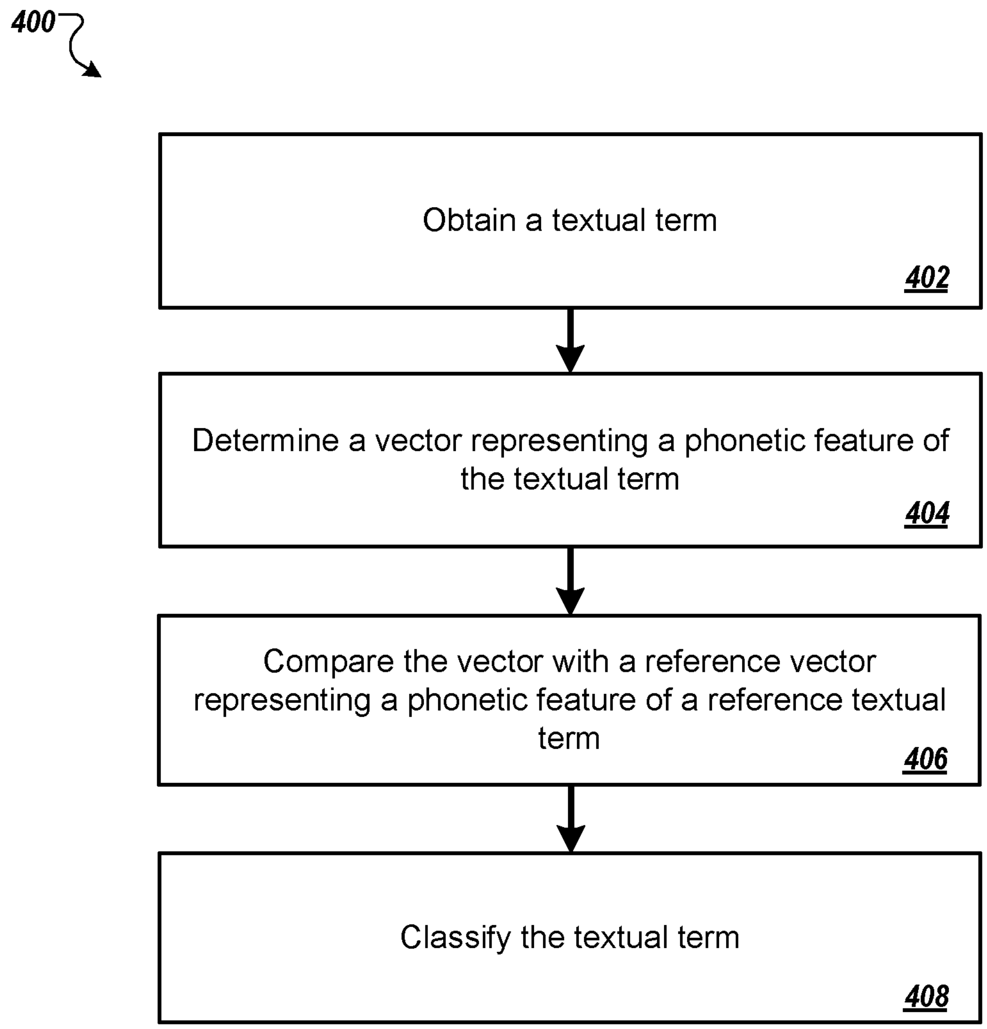
FIG. 4 is a flow chart illustrating an example process for classifying a textual term using phonetic features.

FIG. 4 is a flow diagram that illustrates an example process 400 for classifying a textual term using phonetic features. The process 400 may be performed by data processing apparatus, such as the example system 100 described above, the example system 200 described above, or another data processing apparatus.

The system obtains a textual term (402). For example, the computing system 120 may access a textual term 106 in a resource 104. In some implementations, the system obtains the textual term from a resource stored at a remote computer. In some other implementations, the system obtains the textual term from a search query.

The system determines a vector representing a phonetic feature of the textual term (404). For example, the phonetic engine 108 may determine the phonetic features of the textual term 106, and generates phonetic features 110. The trained model 118 may determine a representation vector 120 based on the phonetic features 110.

In some implementations, the system determines the vector representing the phonetic feature of the textual term by determining a pronunciation of the textual term. For example, the phonetic engine 108 may use a pronunciation dictionary to predict the pronunciation of the textual term 106. As another example, the phonetic engine 108 may use a set of acoustic rules to predict the pronunciation of the textual term 106. As another example, the phonetic engine 108 may input the textual term 106 to a trained acoustic model to generate a predicted pronunciation of the textual term 106.

The system compares the vector representing the phonetic feature of the textual term with a reference vector representing a phonetic feature of a reference textual term (406). For example, the classifier engine 112 may compare the representation vector 120 with one or more reference vectors in the vector space.

The system classifies the textual term based on the comparing the vector with the reference vector (408). In some implementations, the system compares the vector with the reference vector by determining a cosine distance between the vector and the reference vector.

In some implementations, the system classifies the textual term by determining that the cosine distance is within a specific distance. In response to determining that the cosine distance is within the specific distance, the system classifies the textual term as being similar to the reference textual term. For example, a resource 104 may include a textual term 106 "Vehecle" that is an unintended spelling error of a known textual term "Vehicle." The classifier engine 112 may determine that the representation vector of the textual term 106 "Vehecle" is within the specific vector distance to the reference vector of the known textual term "Vehicle," and the classifier engine 112 may classify that the textual term 106 "Vehecle" is related to the known textual term "Vehicle" because their phonetic features (e.g., pronunciations) are similar.

In some implementations, the system classifies the textual term by determining a likelihood that the textual term is similar to the reference textual term. The system classifies the textual term based on the likelihood at the textual term is similar to the reference textual term. For example, the classified textual term 114 may be a word score vector, where each field of the word score vector corresponds to a respective known textual term in a set of known textual terms. Each field of the word score vector may include a score indicating a probability that the definition of the textual term 106 corresponds to the definition of the respective known textual term. The classifier engine 112 may determine that the textual term 106 is similar to a particular known textual term if the particular known textual term has the highest score in the word score vector.

In some implementations, the system classifies the textual term by determining that the textual term is similar to the reference textual term. In response to determining that the textual term is similar to the reference textual term, associating a definition of the reference textual term to the textual term.

The textual term can include multiple characters. The system determines the vector representing the phonetic feature of the textual term by determining a first vector representing a phonetic feature of a subset of the characters of the textual term. For example, for the textual term "CompuVehicle", the trained model 118 may determine a respective representation vector for a textual term "Compu." The system classifies the textual term by determining that the subset of the characters of the textual term is similar to the reference textual term based on the comparing the vector with the reference vector. In response to determining that the subset of the characters of the textual term is similar to the reference textual term, the system associates a definition of the reference textual term to the subset of the characters of the textual term. For example, the classifier engine 112 may determine that the cosine distance between the representation vector of the separated textual term "Compu" is within the specific vector distance with the reference vector of a known textual term "Computer," and the classifier engine 112 may classify that the separated textual term "Compu" is related to the known textual term "Computer."

The system determines a second vector representing a phonetic feature of a second subset of the characters of the textual term. For example, for the textual term "CompuVehicle", the trained model 118 may determine a respective representation vector for a textual term "Vehicle." The system compares the second vector with a second reference vector representing a phonetic feature of a second reference textual term. The system determines that the second subset of the characters is similar to the second reference textual term based on comparing the second vector with the second reference vector. In response to determining that the second subset of the characters is similar to the second reference textual term, the system associates a definition of the second reference textual term to the second subset of the characters of the textual term. For example, the classifier engine 112 may determine that the representation vector of the separated textual term "Vehicle" is numerically equal to the reference vector of a known textual term "Vehicle," and the classifier engine 112 may classify that the separated textual term "Vehicle" is equivalent of the known textual term "Vehicle."

In some implementations, the system obtains one or more textual terms that are surrounding the textual term. For example, the trained model 218 obtains surrounding textual terms 204. The surrounding textual terms 204 may be all terms within a specific number of terms adjacent to the textual term 106. The surrounding textual terms 204 may be all terms within a specific number of terms adjacent to the textual term 106, excluding specific terms (e.g., "a", "an", "the", etc.). The system determines the vector representing the phonetic feature of the textual term by determining the vector using (i) the phonetic feature of the textual term and (ii) the one or more textual terms that are surrounding the textual term. For example, the trained model 218 may add one or more dimensions in the word-based vector space to represent the phonetic features of textual terms. The trained model 218 may map the phonetic features 110 to the additional dimensions, and the values in the additional dimensions may be used by the classifier engine 212 to classify the textual term 106.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

An "engine" (or "software engine") refers to a software implemented input/output system that provides an output that is different from the input. An engine can be an encoded block of functionality, such as a library, a platform, a Software Development Kit ("SDK"), or an object.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method, comprising:

obtaining an unknown textual term and other terms surrounding the unknown textual term with N word positions of the unknown textual term, wherein the unknown textual term is a textual term that has an unknown dictionary definition, and N is a predetermined integer value;

determining, by one or more computers, an unknown term vector representing (i) one or more phonetic features of the unknown textual term and (ii) the other terms surrounding the unknown textual term, including determining the unknown term vector using (i) the one or more phonetic features of the unknown textual term and (ii) the one or more other textual terms that are surrounding the unknown textual term;

classifying the unknown textual term based on (i) a word-based model that uses the representation of the one or more other textual terms that are surrounding the unknown textual term to classify the unknown textual term; and (ii) a classifier that compares the representation of the one or more phonetic features of the unknown textual term to each of a plurality of reference vectors in a vector space, wherein each reference vector represents a reference textual term having a known definition;

wherein classifying the unknown textual term comprises:

determining a level of similarity between the unknown textual term vector and each of the plurality of reference vectors; and generating a classified textual term that includes a word score vector comprised of a plurality of fields that each correspond to a respective reference textual term having a known dictionary definition, wherein generating the classified textual term further includes determining a score for each respective field of the word score vector that is (i) based on the similarity determination of the unknown textual vector and the reference vector that represents the respective reference textual term that is associated with the respective field, and (ii) indicative of the probability that the definition of the unknown textual term corresponds to the definition of the respective reference textual term that is associated with the respective field; and providing the classified textual term as an input to a word model, wherein the word model is configured to process the classified textual term and generate one or more representation vectors, based on the classified textual term.

2. The method of claim 1, wherein classifying the unknown textual term based on (i) a word-based model that representation of the one or more other textual terms that are surrounding the unknown textual term; and (ii) a classifier that compares the representation of the one or more phonetic features of the unknown textual term to each of a plurality of reference vectors in a vector space comprises:

using the classifier to compare the representation of the one or more phonetic features of the unknown textual term to each of a plurality of reference vectors in a vector space only in response to determining that the word-based model cannot classify the unknown textual term.

3. The method of claim 1, wherein classifying the unknown textual term based on (i) a word-based model that representation of the one or more other textual terms that are surrounding the unknown textual term; and (ii) a classifier that compares the representation of the one or more phonetic features of the unknown textual term to each of a plurality of reference vectors in a vector space further comprises:

using the classifier to compare the representation of the one or more phonetic features of the unknown textual term to each of a plurality of reference vectors in a vector space only in response to determining that the word-based model cannot classify the unknown textual term.

4. The method of claim 1, wherein obtaining the unknown textual term comprises obtaining the unknown textual term from a resource stored at a remote computer.

5. The method of claim 1, wherein obtaining the unknown textual term comprises obtaining the unknown textual term from a search query.

6. The method of claim 1, wherein determining the unknown term vector representing the phonetic feature of the unknown textual term comprises determining a pronunciation of the unknown textual term.

7. A non-transitory computer-readable medium storing software having stored thereon instructions, which, when executed by one or more computers, cause the one or more computers to perform operations of:

obtaining an unknown textual term and other terms surrounding the unknown textual term with N word positions of the unknown textual term, wherein the unknown textual term is a textual term that has an unknown dictionary definition, and N is a predetermined integer value;

determining, by one or more computers, an unknown term vector representing (i) one or more phonetic features of the unknown textual term and (ii) the other terms surrounding the unknown textual term, including determining the unknown term vector using (i) the one or more phonetic features of the unknown textual term and (ii) the one or more other textual terms that are surrounding the unknown textual term;

classifying the unknown textual term based on (i) a word-based model that uses the representation of the one or more other textual terms that are surrounding the unknown textual term to classify the unknown textual term; and (ii) a classifier that compares the representation of the one or more phonetic features of the unknown textual term to each of a plurality of reference vectors in a vector space, wherein each reference vector represents a reference textual term having a known definition;

wherein classifying the unknown textual term comprises:

determining a level of similarity between the unknown textual term vector and each of the plurality of reference vectors; and generating a classified textual term that includes a word score vector comprised of a plurality of fields that each correspond to a respective reference textual term having a known dictionary definition, wherein generating the classified textual term further includes determining a score for each respective field of the word score vector that is (i) based on the similarity determination of the unknown textual vector and the reference vector that represents the respective reference textual term that is associated with the respective field, and (ii) indicative of the probability that the definition of the unknown textual term corresponds to the definition of the respective reference textual term that is associated with the respective field; and providing the classified textual term as an input to a word model, wherein the word model is configured to process the classified textual term and generate one or more representation vectors, based on the classified textual term.

8. The non-transitory computer-readable medium of claim 7, wherein classifying the unknown textual term based on (i) a word-based model that representation of the one or more other textual terms that are surrounding the unknown textual term; and (ii) a classifier that compares the representation of the one or more phonetic features of the unknown textual term to each of a plurality of reference vectors in a vector space comprises:

using the classifier to compare the representation of the one or more phonetic features of the unknown textual term to each of a plurality of reference vectors in a vector space only in response to determining that the word-based model cannot classify the unknown textual term.

9. The non-transitory computer-readable medium claim 7, wherein classifying the unknown textual term based on (i) a word-based model that representation of the one or more other textual terms that are surrounding the unknown textual term; and (ii) a classifier that compares the representation of the one or more phonetic features of the unknown textual term to each of a plurality of reference vectors in a vector space further comprises:

using the classifier to compare the representation of the one or more phonetic features of the unknown textual term to each of a plurality of reference vectors in a vector space only in response to determining that the word-based model cannot classify the unknown textual term.

10. The non-transitory computer-readable medium of claim 7, wherein obtaining the unknown textual term comprises obtaining the unknown textual term from a resource stored at a remote computer.

11. The non-transitory computer-readable medium of claim 7, wherein obtaining the unknown textual term comprises obtaining the unknown textual term from a search query.

12. The non-transitory computer-readable medium of claim 7, wherein determining the unknown term vector representing the phonetic feature of the unknown textual term comprises determining a pronunciation of the unknown textual term.

13. A system comprising:

one or more processors and one or more computer storage media storing instructions that are operable, when executed by the one or more processors, to cause the one or more processors to perform operations comprising:

computers to perform operations of:

obtaining an unknown textual term and other terms surrounding the unknown textual term with N word positions of the unknown textual term, wherein the unknown textual term is a textual term that has an unknown dictionary definition, and N is a predetermined integer value;

determining, by one or more computers, an unknown term vector representing (i) one or more phonetic features of the unknown textual term and (ii) the other terms surrounding the unknown textual term, including determining the unknown term vector using (i) the one or more phonetic features of the unknown textual term and (ii) the one or more other textual terms that are surrounding the unknown textual term; and classifying the unknown textual term based on (i) a word-based model that uses the representation of the one or more other textual terms that are surrounding the unknown textual term to classify the unknown textual term; and (ii) a classifier that compares the representation of the one or more phonetic features of the unknown textual term to each of a plurality of reference vectors in a vector space, wherein each reference vector represents a reference textual term having a known definition;

wherein classifying the unknown textual term comprises:

determining a level of similarity between the unknown textual term vector and each of the plurality of reference vectors; and generating a classified textual term that includes a word score vector comprised of a plurality of fields that each correspond to a respective reference textual term having a known dictionary definition, wherein generating the classified textual term further includes determining a score for each respective field of the word score vector that is (i) based on the similarity determination of the unknown textual vector and the reference vector that represents the respective reference textual term that is associated with the respective field, and (ii) indicative of the probability that the definition of the unknown textual term corresponds to the definition of the respective reference textual term that is associated with the respective field; and providing the classified textual term as an input to a word model, wherein the word model is configured to process the classified textual term and generate one or more representation vectors, based on the classified textual term.

* * * * *